US011732673B2

(12) United States Patent
Dindar et al.

(10) Patent No.: US 11,732,673 B2
(45) Date of Patent: Aug. 22, 2023

(54) VARIABLE AREA EXHAUST NOZZLE SYSTEM AND METHOD FOR CONTROL THEREOF

(71) Applicant: General Electric Company, Schenectady, NY (US)

(72) Inventors: Mustafa Dindar, West Chester, OH (US); Bernard James Renggli, Cincinnati, OH (US); Andrew J. Hank, Maineville, OH (US); Daniel Robert Dwyer, West Chester, OH (US); Jeffrey S. Spruill, Hillsboro, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/386,065

(22) Filed: Jul. 27, 2021

(65) Prior Publication Data
US 2023/0035756 A1    Feb. 2, 2023

(51) Int. Cl.
*F02K 1/09* (2006.01)
*F02K 1/18* (2006.01)
*F02K 1/08* (2006.01)
*B64D 33/04* (2006.01)

(52) U.S. Cl.
CPC ............... *F02K 1/09* (2013.01); *B64D 33/04* (2013.01); *F02K 1/08* (2013.01); *F02K 1/18* (2013.01); *F05D 2220/323* (2013.01); *F05D 2240/1281* (2013.01); *F05D 2250/34* (2013.01)

(58) Field of Classification Search
CPC .. F02K 1/08; F02K 1/09; B64D 33/04; B64D 33/06; F05D 2220/323; F05D 2240/1281; F05D 2250/34
See application file for complete search history.

(56) References Cited

U.S. PATENT DOCUMENTS

| 3,138,921 | A |   | 6/1964  | Prince, Jr.                |
|-----------|---|---|---------|----------------------------|
| 3,243,126 | A |   | 3/1966  | Kurti et al.               |
| 3,289,946 | A | * | 12/1966 | Lennard ............ F02K 1/08 |
|           |   |   |         | 239/265.39                 |
| 3,598,318 | A |   | 8/1971  | Schiel                     |
| 3,829,020 | A |   | 8/1974  | Steams                     |
| 4,043,508 | A | * | 8/1977  | Speir ................ F02K 1/08 |
|           |   |   |         | 239/265.19                 |
| 4,176,792 | A |   | 12/1979 | McCardle, Jr.              |

(Continued)

FOREIGN PATENT DOCUMENTS

| GB | 1114478 A       | 5/1968 |
|----|-----------------|--------|
| WO | WO 83/03281 A1  | 9/1983 |
| WO | WO2019121022 A1 | 6/2019 |

*Primary Examiner* — Craig Kim
(74) *Attorney, Agent, or Firm* — Dority & Manning, P.A.

(57) ABSTRACT

A variable area exhaust nozzle defining an actual area ratio for a gas turbine engine that includes a shroud assembly having a fixed shroud and an adjustable cowl, an adjustable plug, a nozzle adjustment assembly, and a controller configured to receive data indicative of an operating speed of the gas turbine engine; determine a target area ratio based at least in part on received data indicative of the operating speed of the gas turbine engine; and operate the nozzle adjustment assembly to selectively adjust at least one of the adjustable cowl or the adjustable plug such that the actual area ratio is substantially equivalent to the target area ratio.

20 Claims, 9 Drawing Sheets

(56) References Cited

U.S. PATENT DOCUMENTS

| | | | | |
|---|---|---|---|---|
| 4,802,629 | A | * | 2/1989 | Klees .................. F02K 1/625 |
| | | | | 239/265.33 |
| 5,216,878 | A | | 6/1993 | Klees |
| 5,221,048 | A | | 6/1993 | Lair |
| 5,884,843 | A | * | 3/1999 | Lidstone ................ F02K 1/36 |
| | | | | 239/265.17 |
| 6,546,716 | B2 | | 4/2003 | Lair |
| 7,174,704 | B2 | * | 2/2007 | Renggli ................ F02K 1/09 |
| | | | | 60/770 |
| 7,178,338 | B2 | * | 2/2007 | Whurr .................. F02K 1/08 |
| | | | | 239/265.19 |
| 8,091,334 | B2 | * | 1/2012 | Moniz .................. F02K 1/08 |
| | | | | 60/226.3 |
| 8,459,036 | B2 | * | 6/2013 | Baker .................. F02K 3/075 |
| | | | | 60/226.3 |
| 10,087,885 | B2 | | 10/2018 | Kohlenberg et al. |
| 10,156,207 | B2 | * | 12/2018 | Osman .................. F02K 1/36 |
| 10,563,614 | B2 | | 2/2020 | Smith et al. |
| 2011/0108357 | A1 | * | 5/2011 | Vauchel ................ F02K 1/827 |
| | | | | 181/222 |
| 2011/0120079 | A1 | | 5/2011 | Schwark, Jr. et al. |
| 2015/0121841 | A1 | * | 5/2015 | Izquierdo .............. F02K 3/077 |
| | | | | 60/226.3 |
| 2016/0123178 | A1 | * | 5/2016 | Tersmette .............. F01D 17/14 |
| | | | | 239/11 |
| 2019/0210710 | A1 | * | 7/2019 | Dindar .................. B64C 21/10 |
| 2021/0270145 | A1 | * | 9/2021 | Sanderson ............ F01D 17/167 |
| 2021/0310377 | A1 | * | 10/2021 | Corsmeier ............ F01D 25/14 |
| 2021/0388737 | A1 | * | 12/2021 | Foxall .................. F01D 25/285 |
| 2022/0054787 | A1 | * | 2/2022 | Dwyer .................. B01D 46/521 |

\* cited by examiner

VARIABLE AREA EXHAUST NOZZLE SYSTEM AND METHOD FOR CONTROL THEREOF

FIELD OF THE DISCLOSURE

The present subject matter relates generally to gas turbine engines and, more particularly, to a variable area exhaust nozzle system including an adjustable cowl and adjustable plug and method for controlling the system.

BACKGROUND OF THE DISCLOSURE

A gas turbine engine generally includes, in serial flow order, a compressor section, a combustion section, a turbine section, and an exhaust section. In operation, air enters an inlet of the compressor section where one or more axial or centrifugal compressors progressively compress the air until it reaches the combustion section. Fuel is mixed with the compressed air and burned within the combustion section to provide combustion gases. The combustion gases flow from the combustion section through a hot gas path defined within the turbine section and is then exhausted from the turbine section via the exhaust nozzle.

For efficient operation of gas turbine engines, i.e., to minimize the amount of fuel required to generate a given amount of thrust, it is desirable that the flow output of both the turbine and fan be precisely controlled as to both amount of flow and direction. Certain gas turbine engines include exhaust nozzles with overlapping flaps and seals to vary the flow output of the engine. The inventors of the present disclosure have found that an improved variable area exhaust nozzle would be welcomed within the technology.

BRIEF DESCRIPTION OF THE DISCLOSURE

Aspects and advantages of the present disclosure will be set forth in part in the following description, or may be obvious from the description, or may be learned through practice of the present disclosure.

In one exemplary embodiment, a variable area exhaust nozzle for a gas turbine engine is provided. The gas turbine engine defines an axial direction. The variable area exhaust nozzle includes a shroud assembly defining an aft end and including a fixed shroud and an adjustable cowl mechanically coupled to the fixed shroud. The variable area exhaust nozzle also includes an adjustable plug slidably positioned within the fixed shroud and being movable between a retracted position and an extended position along the axial direction. An annular passage is defined between the adjustable cowl and the adjustable plug. The variable area exhaust nozzle further defines an actual area ratio equivalent to a nozzle exit area over a nozzle throat area. The variable area exhaust nozzle also includes a nozzle adjustment assembly for selectively positioning at least one of the adjustable cowl or the adjustable plug.

These and other features, aspects and advantages of the present disclosure will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION OF THE DISCLOSURE

Figure 1:
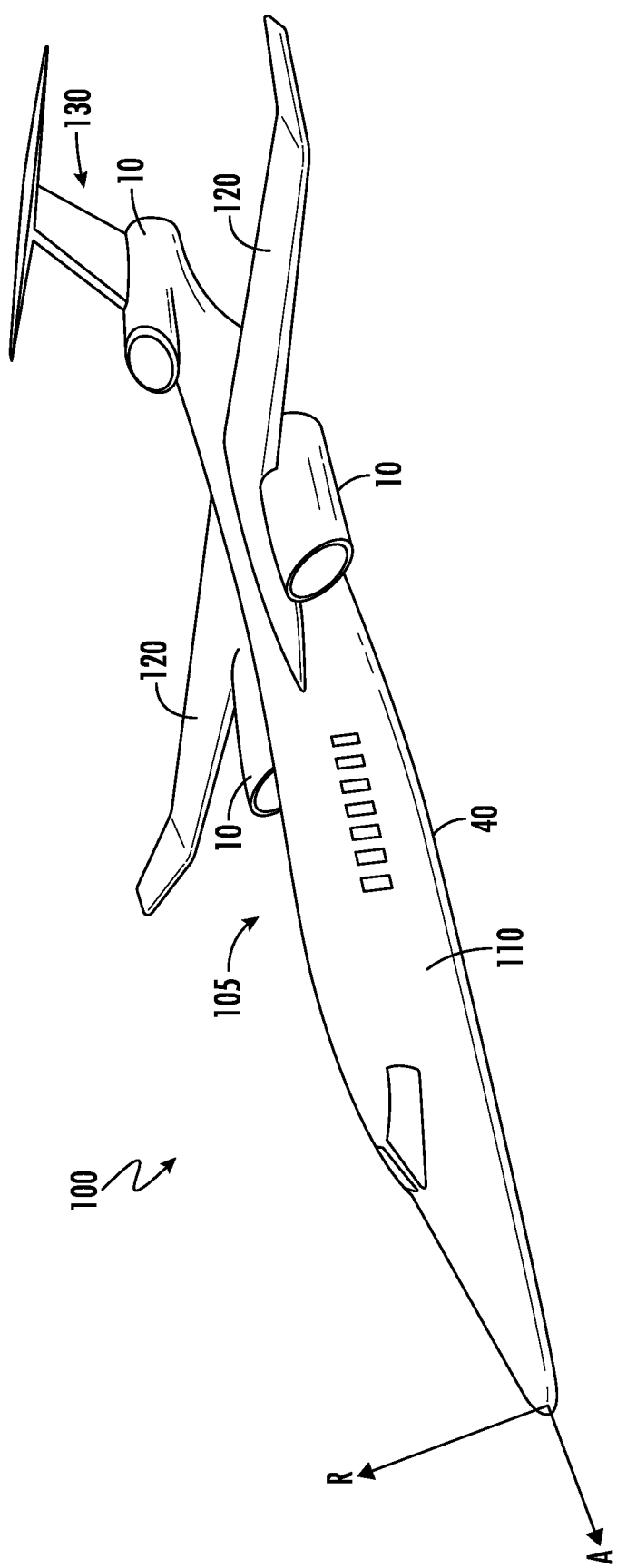
FIG. 1 is a perspective view of an exemplary aircraft according to an aspect of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

The terms "forward" and "aft" refer to relative positions within a component or system and refer to the normal operational attitude of the component or system. For example, with regard to a gas turbine engine, forward refers to a position closer to an inlet of the gas turbine engine and aft refers to a position closer to an exhaust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, the present subject matter is directed to an improved variable area exhaust nozzle system and method for controlling the system. The variable area exhaust nozzle described operates efficiently in a wide variety of flight operating modes by varying flow areas based on the flight operating mode. Exhaust systems for gas turbine engines which operate over a wide range of pressure ratios (i.e., nozzle throat pressure/ambient pressure or "P8/Pamb") require variable geometry in order to adjust the nozzle throat area ("A8") to meet the demands of the engine cycle. Adjusting the nozzle throat area further adjusts the area ratio (i.e., nozzle exit area/nozzle throat area or "A9/A8") to attain good performance at various operating points. For example, when the engine is operating at supersonic flight speeds, i.e., where the Mach number is greater than 1, the exhaust nozzle system must have a nozzle pressure ratio of 6 or 7. This nozzle pressure ratio may be achieved by decreasing the flow exit area of the nozzle. For subsonic flight speeds, the area of the nozzle must be set for high for best performance and to protect the operability of the turbine machinery. The exhaust nozzle must achieve a nozzle pressure ratio of 3. Therefore, the same exhaust nozzle is able to obtain a larger flow exit area by moving the adjustable plug of the exhaust nozzle described in the exemplary embodiment. The variable geometry aspect of the exhaust nozzle system of the present disclosure is capable of changing the nozzle pressure ratio and area ratio to meet the above requirements across a range of operating conditions, e.g., in response to data indicative of a flight mode or flight speed, to achieve more efficient operation across a wide range of engine operating conditions.

Referring now to the drawings, in FIG. 1, an exemplary embodiment of an aircraft 100 according to an aspect of the present disclosure is provided. The aircraft 100 includes an aircraft structure or airframe 105. The airframe 105 includes a fuselage 110 to which wings 120 and an empennage 130 are attached. A propulsion system 10 according to aspects of the present disclosure is attached to one or more portions of the airframe. In certain instances, the propulsion system 10 is attached to the fuselage 110. In certain other instances, the propulsion system 10 is attached underneath, above, or through the wing 120 and/or portion of the empennage 130.

In various embodiments, the propulsion system 10 is attached to the airframe 105 via a pylon or other mounting structure. In still other embodiments, the propulsion system 10 is housed within the airframe, such as may be exemplified in certain supersonic military or commercial aircraft. The propulsion system 10 may generally be configured as a turbo machine, such as a gas turbine engine including a compressor section, a heat addition or combustion section, and a turbine section in serial flow arrangement. The core engine 40 may include one or more rotor assemblies including one or more shafts coupling respective compressors and turbines.

In the embodiment depicted, the aircraft 100 is configured as a supersonic aircraft configured to operate at flight speeds greater than Mach 1. Further, as shown in FIG. 1, the propulsion system 10 defines an axial direction A. A radial plane that is perpendicular to the axial direction A of the axis of rotation of the propulsion system 10 is defined by a radial direction R.

Certain embodiments of the propulsion system 10 are configured as a turbofan or turbojet engine including a fan assembly operatively connected to the core engine 40. It also should be appreciated, that in still other exemplary embodiments, aspects of the present disclosure may be incorporated into any other suitable type of gas turbine engine. For example, aspects of the present disclosure may be incorporated into, e.g., a turboshaft engine, turboprop engine, turbojet engine, industrial and marine gas turbine engines, auxiliary power units, etc. These terms, and, more specifically, gas turbine engine, may be used interchangeably to refer to the same propulsion system 10.

Figure 2:
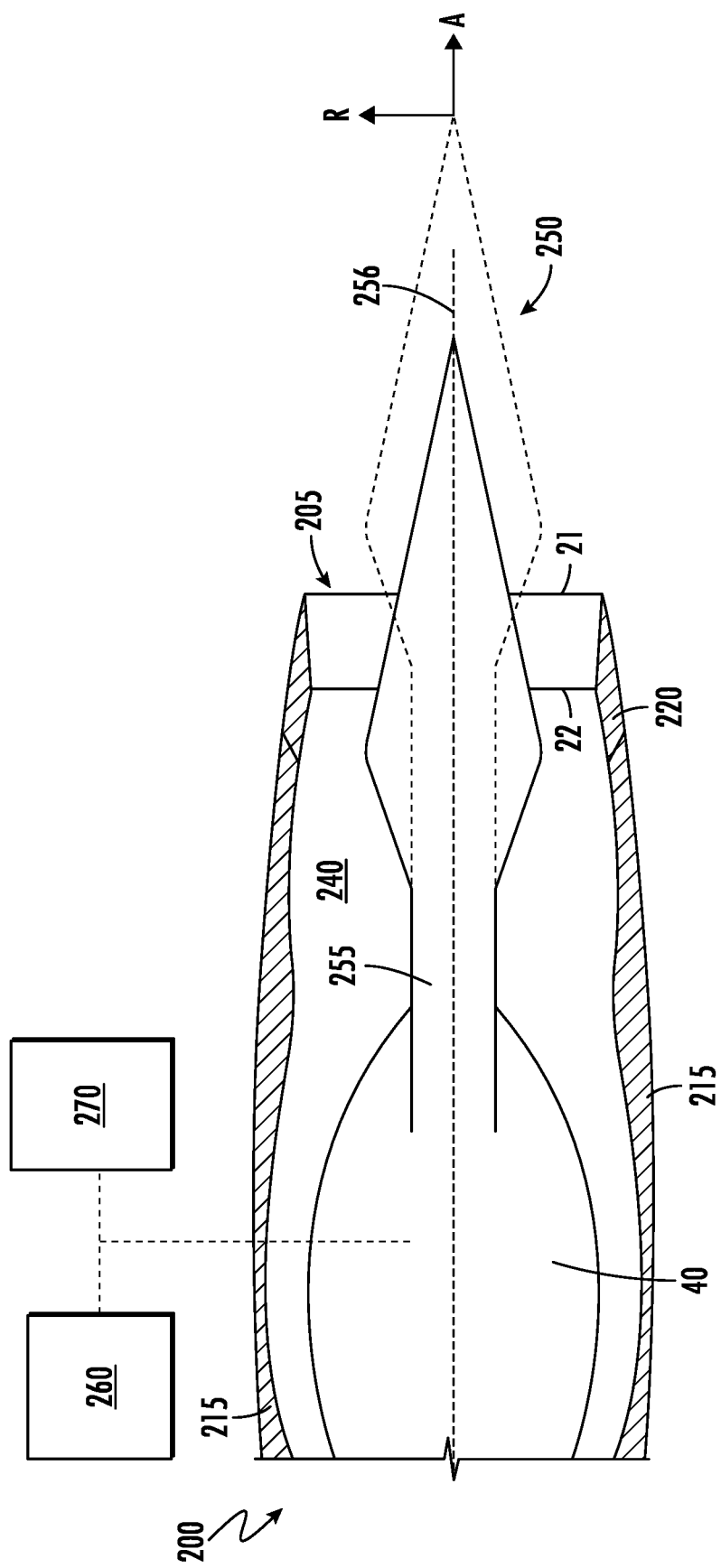
FIG. 2 illustrates a partial, cross-sectional view of the variable area exhaust nozzle of the gas engine turbine described above with reference to FIG. 1, particularly illustrating the shroud assembly, adjustable plug, nozzle adjustment assembly, and controller.

Referring now to FIG. 2, a partial, cross-sectional view of a variable area exhaust nozzle system 200 of the gas engine turbine described above with reference to FIG. 1 is illustrated in accordance with embodiments of the present subject matter. As shown, the variable area exhaust nozzle system 200 is positioned along the axial direction A and comprises a shroud assembly 210 and an adjustable plug 250. The shroud assembly 210 defines an aft end 205 and comprises a fixed shroud 215 and an adjustable cowl 220 mechanically coupled to the fixed shroud 215. The adjustable cowl 220 is movable between a retracted position and an extended position along the axial direction A. FIG. 2 shows the adjustable cowl 220 in the retracted position, where the adjustable cowl 220 is immediately adjacent the aft end of the fixed shroud 215. Immediately adjacent may refer to directly next to. For example, in the exemplary embodiment, the forward end of the adjustable cowl 220 sits flush with the aft end of the fixed shroud 215 in the retracted position. In the extended position, the adjustable cowl 220 is spaced apart from the fixed shroud 215, thereby defining a bypass passage 225. Spaced apart refers to any position of the adjustable cowl 220 where it is not in the retracted position and immediately adjacent to the fixed shroud 215.

FIG. 2 also shows the adjustable plug 250 slidably positioned within the fixed shroud 215. The illustrated adjustable plug 250 includes a profiled tail cone 256 and a shaft 255, with the profiled tail cone 256 defined at the aft end 205 of the shaft 255. However, it will be appreciated that the adjustable plug 250 can have any shape that is operable with the variable area exhaust nozzle system 200 described. Further, the adjustable plug 250 is movable between a retracted position and an extended position along the axial direction A. The retracted position of the adjustable plug 250 is shown in a solid line, with almost the entirety of the adjustable plug 250 within the fixed shroud 215. The extended position of the adjustable plug 250 is shown in a dotted line, with almost the entirety of the profiled tail cone 256 positioned outside of the fixed shroud 215. The adjustable plug 250 further defines an annular passage 240 between the adjustable cowl 220 and the adjustable plug 250 as shown.

The variable area exhaust nozzle system 200 defines an actual area ratio 20. As used herein, the term "area ratio" is equivalent to a nozzle exit area 21 over a nozzle throat area 22. In this regard, the "nozzle exit area" generally refers to a maximum cross-sectional area of the annular passage 240 at the aft end 205 of the shroud assembly 210 (identified herein generally as "A9"). In addition, as mentioned above, the adjustable cowl 220 can be extended to define the bypass passage 225, in which case the cross-sectional area of the bypass passage 225 is further included in the nozzle exit area 21. In addition, the "nozzle throat area" generally refers to a minimum cross-sectional area of the annular passage 240 at the widest point of the profiled tail cone 256 (identified herein generally as "A8"). According to the illustrated exemplary embodiment, the cross-sectional nozzle throat area 22 (A8) and nozzle exit area 21 (A9) may be measured within the radial plane defined by the radial direction R. The nozzle throat area 22 (A8), is the minimum cross-sectional area of the annular passage 240 between the widest portion of the profiled tail cone 256 and the shroud assembly 210. The maximum cross-sectional area of the annular passage 240 at the aft end 205 of the shroud assembly 210, or nozzle exit area 21 (A9), is the area where the flow exits the nozzle. It will be appreciated that this area ratio may refer to any range of area ratios within which the propulsion system 10 (such as a gas turbine engine) can operate, and that the terms A8 and A9 may also include definitions known to those of ordinary skill in the art.

These area ratios are important for efficient operation of gas turbine engines, i.e., to minimize the amount of fuel required to generate a given amount of thrust. Therefore, it is desirable that the flow output of both the turbine and fan be precisely controlled as to both amount of flow and direction. Flow control may be achieved by adjusting the geometry of the variable area exhaust nozzle system 200 and, subsequently, the nozzle exit area 21 and/or nozzle throat area 22 to vary the actual area ratio 20 to match a target area ratio 25 in order to achieve optimized flight.

As used herein, the term "actual area ratio" is the measured area ratio of the variable area exhaust nozzle system 200. The term "target area ratio" is the desired area ratio of the variable area exhaust nozzle system 200 based on operating speed. A controller 270 implements an algorithm to drive the actual area ratio 20 to the target area ratio 25.

A nozzle adjustment assembly 260, operably coupled to the controller 270, selectively positions the adjustable cowl 220, adjustable plug 250, or both. The controller 270 is configured to obtain an operating speed of the gas turbine engine; determine the target area ratio 25 based at least in part on the operating speed of the gas turbine engine and operate the nozzle adjustment assembly 260 to selectively adjust at least one of the adjustable cowl 220 or the adjustable plug 250 such that the actual area ratio 20 is substantially equivalent to the target area ratio 25. In the exemplary embodiment, the nozzle adjustment assembly 260 includes a cowl adjustment mechanism 265 mechanically coupling the adjustable cowl 220 to the fixed shroud 215 for selectively moving the adjustable cowl 220 along the axial direction A, towards aft end 205, relative to the fixed shroud 215. The nozzle adjustment assembly 260 may also include a plug adjustment mechanism 268. The plug adjustment mechanism 268 mechanically couples the adjustable plug 250 to the gas turbine engine and selectively moves the adjustable plug 250 along the axial direction A, towards aft end 205, relative to the fixed shroud 215. By selectively positioning the adjustable cowl 220 or the adjustable plug 250, the nozzle adjustment assembly 260 is able to vary the nozzle throat area 22 (A8) or the nozzle exit area 21 (A9), thereby changing the actual area ratio 20 to meet the target area ratio 25.

Figure 3:
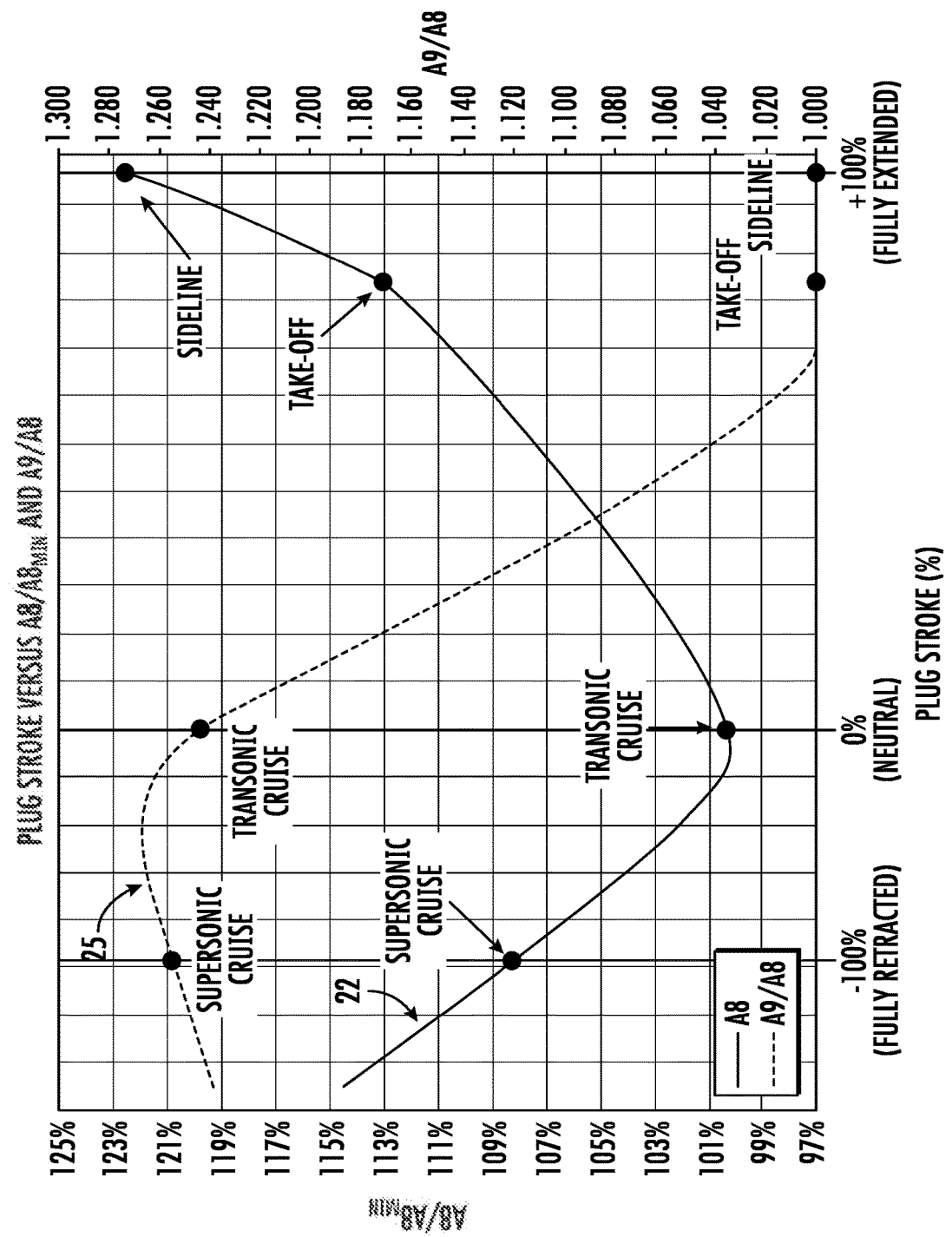
FIG. 3 shows a plot of the target area ratio and the nozzle throat area, shown by the dotted line and the solid line, respectively, for a range of engine speeds and as a function of plug stroke.

For example, referring briefly to FIG. 3, a plot of the target area ratio 25 (A9/A8), shown by the dotted line, for a range of engine speeds is provided. Generally, the area ratio of the gas turbine engine may be in a range between about 1 and about 1.3. FIG. 3 also illustrates, on the solid line, the nozzle throat area 22 (A8), shown as a percentage of the nozzle throat area 22 (A8) for the given stroke divided by the minimum nozzle throat area ("$A8_{min}$"), as a function of the percentage of the stroke of the adjustable plug 250. The percentage of the stroke of the adjustable plug 250 is calculated as a proportion of the plug stroke length 50, where the plug stroke length 50 is the maximum distance between the tip of the profiled tail cone 256 of the adjustable plug 250 in the retracted position and the tip of the profiled tail cone 256 of the adjustable plug 250 in the extended position.

Further, as will be appreciated, the operating speed of the gas turbine engine is related to a flight operating mode, e.g., supersonic cruise, subsonic cruise, transonic cruise, or takeoff. Additionally, as shown in FIG. 3, the percentage of the stroke of the adjustable plug 250 correlates with the flight operating mode of the gas turbine engine. For example, when the gas turbine engine is in the supersonic cruise operating mode, the adjustable plug 250 is at about a −100% stroke position, e.g., a fully retracted position. Similarly, when the adjustable plug 250 is at about a 100% stroke position, e.g., fully extended position, the gas turbine engine may be in the sideline flight operating mode. When the gas turbine engine is in the transonic cruise operating mode, the adjustable plug 250 is at about a 0% stroke position. The 0% stroke position may be a neutral position between the fully retracted position and the fully extended position. The 0% stroke position may be a position halfway between the fully retracted position and the fully extended position, or may be closer to the fully retracted position or closer to the fully extended position.

As shown in FIG. 3, when the flight operating mode is supersonic cruise, e.g., when the adjustable plug 250 is in a fully retracted position, the target area ratio 25 (A9/A8) may be in a range from 1.239 to about 1.280, from about 1.245 to about 1.275, or from about 1.250 to about 1.260. Similarly, nozzle throat area 22 (A8) may be in a range from about 105% to about 113% of the $A8_{min}$, from about 107% to about 111% of the $A8_{min}$, or from about 108% to about 109% of the $A8_{min}$.

Still referring to FIG. 3, when the flight operating mode is transonic cruise, e.g., when the adjustable plug 250 is in a neutral position, the target area ratio 25 (A9/A8) may be in a range from about 1.280 to about 1, from about 1.270 to about 1.060, from about 1.260 to about 1.060, from about 1.255 to about 1.100, from about 1.250 to about 1.160, or from about 1.250 to about 1.240. Likewise, the nozzle throat area 22 (A8) may be in a range from about 97% to about 105% of the $A8_{min}$, from about 99% to about 103% of the $A8_{min}$, or from about 100% to about 101% of the $A8_{min}$. Furthermore, when the flight operating mode is take-off, e.g., when the adjustable plug 250 is in an extended position, the nozzle throat area 22 (A8) may be in a range from about 107% to about 119% of the $A8_{min}$, from about 109% to about 117% of the $A8_{min}$, from about 111% to about 115% of the $A8_{min}$, or from about 112% to about 114% of the $A8_{min}$. When the flight operating mode is sideline, e.g., when the adjustable plug 250 is in the fully extended position, the nozzle throat area 22 (A8) may be in a range from about 119% to about 125%, from about 121% to about 124%, or from about 122% to about 123%. Further, it should be appreciated that the target area ratio 25 may vary depending on the engine type, application, geometry, and various other factors. The values for target area ratio 25 provided herein are only exemplary and are not intended to limit the scope of the present subject matter in any manner.

Referring back to FIG. 2, the controller 270 is shown wirelessly coupled to the nozzle adjustment assembly 260. For example, according to certain embodiments, controller 270 may include a memory and microprocessor, such as a general or special purpose microprocessor operable to execute programming instructions or micro-control code associated with a cleaning cycle. The memory may represent random access memory such as DRAM or read only memory such as ROM or FLASH. In one embodiment, the processor executes programming instructions stored in memory. The memory may be a separate component from the processor or may be included onboard within the processor. Alternatively, controller 270 may be constructed without using a microprocessor, e.g., using a combination of discrete analog and/or digital logic circuitry (such as switches, amplifiers, integrators, comparators, flip-flops, and gates, and the like) to perform control functionality instead of relying upon software. In another embodiment, controller 270 may be directly mechanically coupled to the nozzle adjustment assembly 260.

Figure 4:
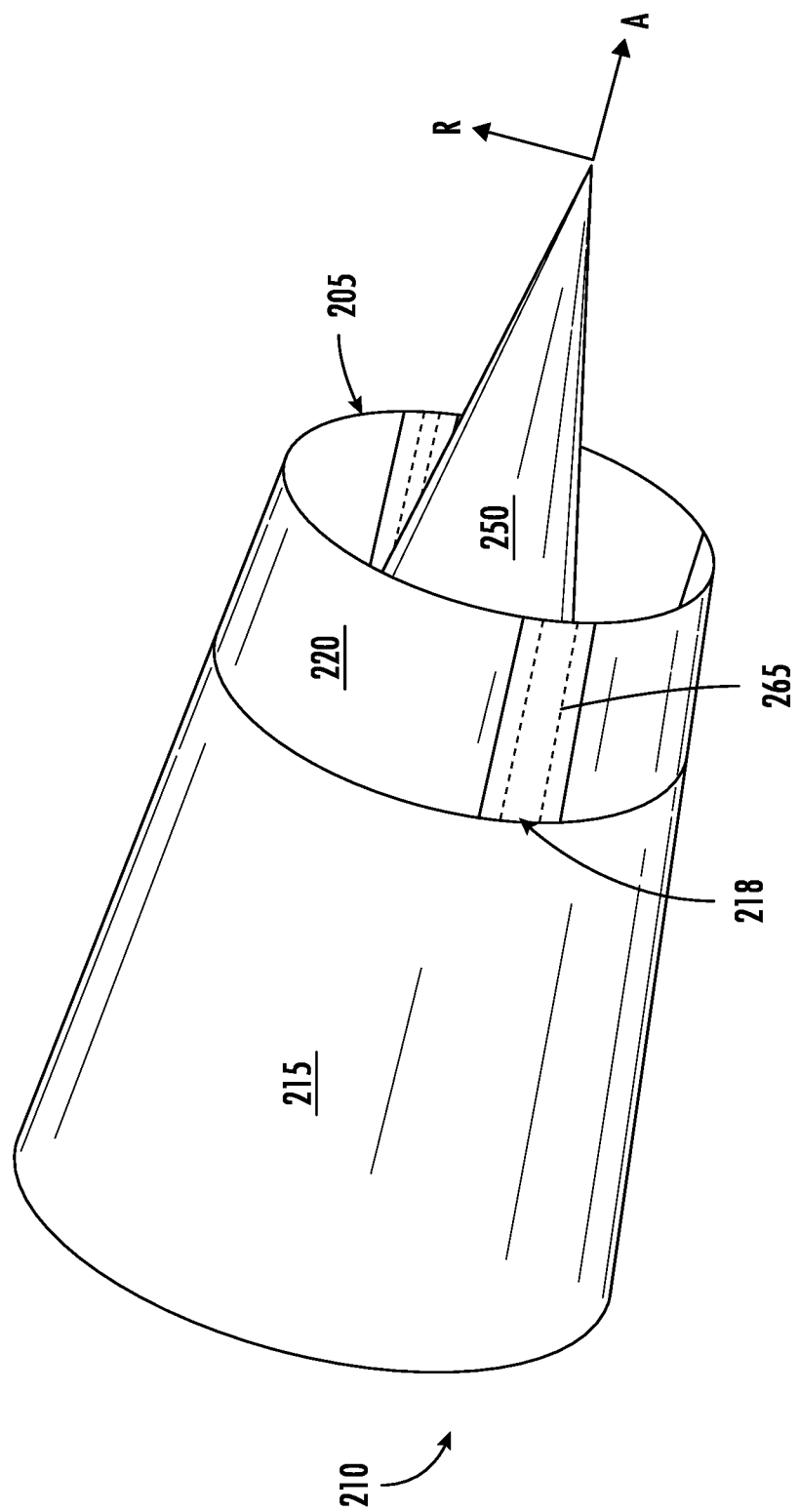
FIG. 4 illustrates a simplified view of one embodiment of the variable area exhaust nozzle system, particularly illustrating a view of the adjustable cowl in a retracted position.
Figure 5:
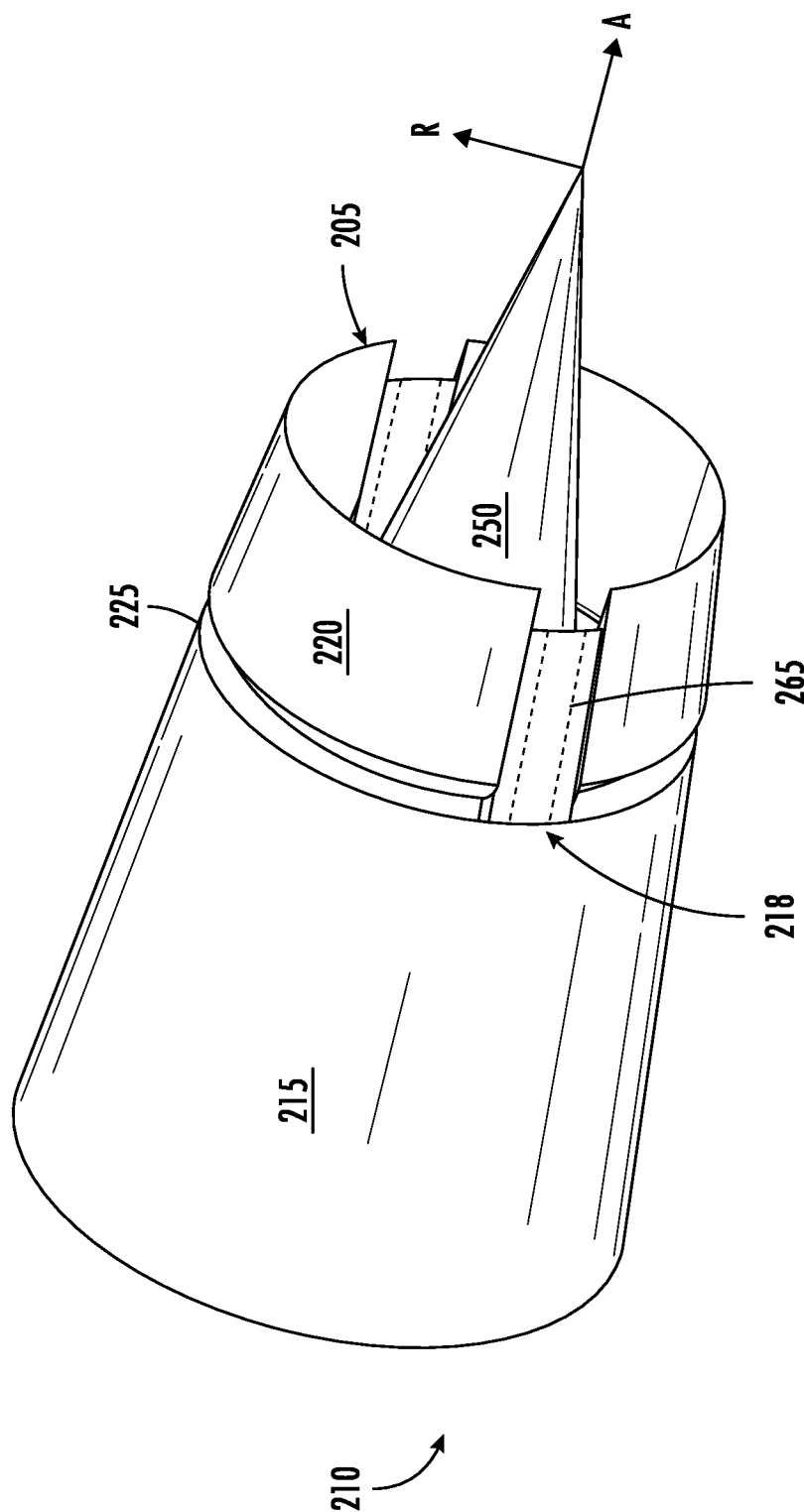
FIG. 5 illustrates a simplified view of another embodiment of the variable area exhaust nozzle system, particularly illustrating a view of the adjustable cowl in an extended position.

Referring now to FIGS. 4 and 5, simplified views of one embodiment of the variable area exhaust nozzle system 200 for the gas turbine engine are illustrated in accordance with aspects of the present subject matter. The system 200 may include one or more support structures positioned proximate the aft end 205 of the fixed shroud 215, wherein "proximate the aft end" refers to a position along the gas turbine engine that is closer to the aft end than the forward end. In the exemplary embodiment, the one or more support structures are a first support member 218A and a second support member 218B, or, collectively, support members 218, that extend along the axial direction A from the fixed shroud 215 and are mechanically coupled to the adjustable cowl. In one embodiment, the support members 218 are manufactured as part of the fixed shroud 215. Alternatively, the support members 218 may be separately manufactured and attached to the aft end 205 of the fixed shroud 215 via welding, screws, or any other means. As shown in the illustrative embodiment, each of the support members 218A, 218B may define an elongated portion extending from the fixed shroud 215. In the exemplary embodiment, there are two support members 218 that extend on opposite sides of the adjustable cowl 220. Additionally, the support members 218 may define receiving structures mechanically coupling the adjustable cowl 220 to the support member 218.

Figure 6:
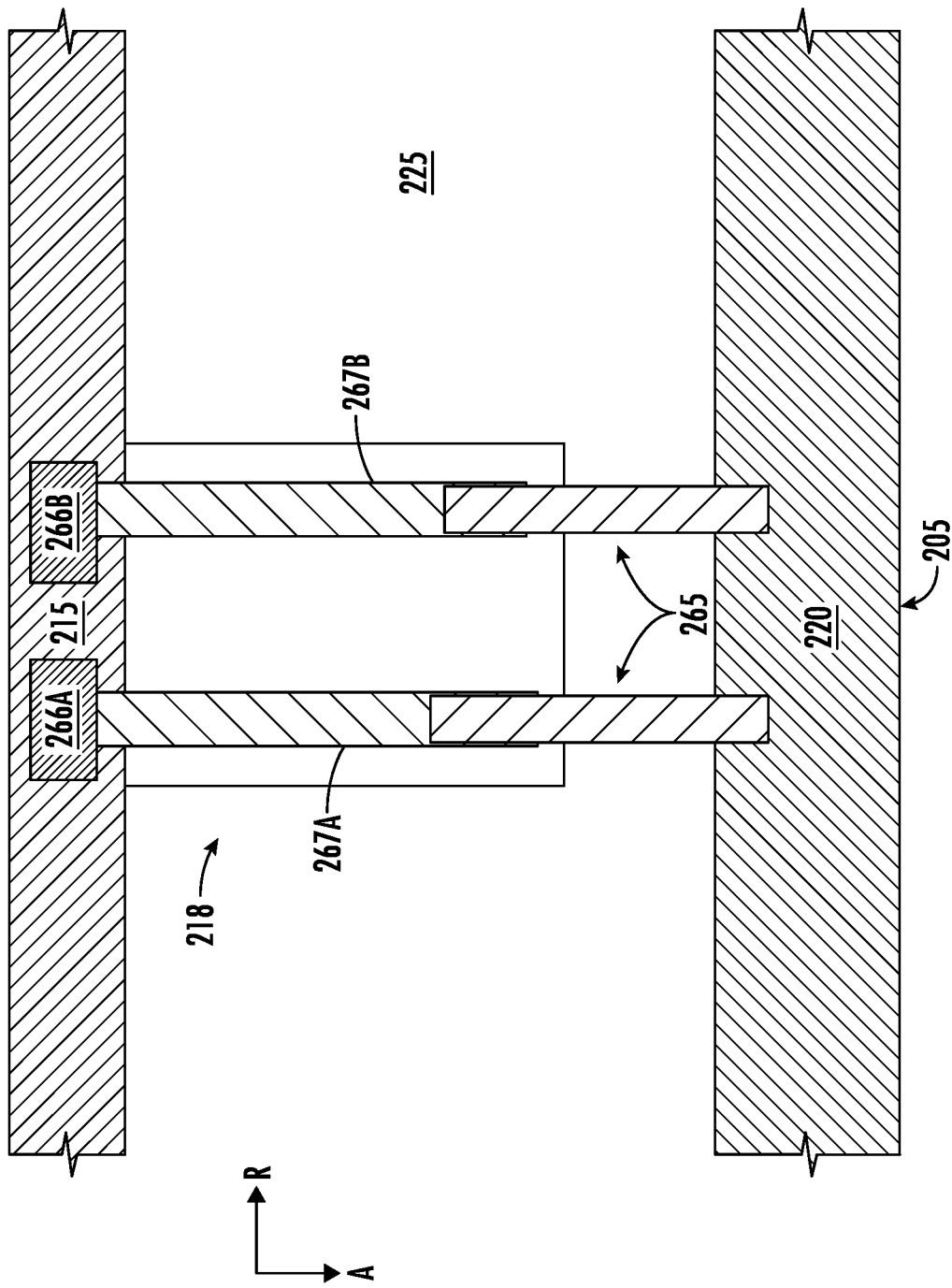
FIG. 6 shows an exemplary embodiment of a support member and cowl adjustment mechanism, the support member including a track system with two tracks and the cowl adjustment mechanism including at least one cowl adjusting actuator.

Referring briefly to FIG. 6, an exemplary embodiment of a support member 218 is shown extending along the axial direction A from the fixed shroud 215 to the adjustable cowl 220. In the illustrated embodiment, the receiving structures are mechanically coupled to one or more track systems 267. Generally, the cowl adjustment mechanism 265 may include at least one cowl adjusting actuator 266 mechanically coupled to each of the track systems 267 within each of the support members 218A, 218B or both of the support members 218. Each track system 267 may include one or more tracks, e.g., a first track 267A and a second track 267B as shown. For example, the track systems may be mechanically coupled to the elongated portions of the support members 218 of the fixed shroud 215 along the axial direction A, with the first track 267A extending along the first elongated portion of the fixed shroud 215 and the second track 267B extending along the second elongated portion of the fixed shroud 215. In the illustration, each track 267A, 267B is attached to an actuator 266A, 266B, respectively. Furthermore, in some embodiments, actuators 266A and 266B may be hydraulic actuators or electric actuators.

It will be appreciated that, in the alternative, the cowl adjustment mechanism 265 may include a hinged or pivoting mechanism that allows the adjustable cowl 220 to rotate or pivot away from the fixed shroud 215. In this specific embodiment, the cowl adjustment mechanism 265 would not move the adjustable cowl 220 along the axial direction A but rather along the radial direction R.

Referring back to FIG. 4, the adjustable cowl 220 is shown in a retracted position that is immediately adjacent the aft end 205 of the fixed shroud 215. For example, the adjustable cowl 220 may be directly next to or flush with the aft end 205 of the fixed shroud 215. As shown in the illustrative embodiment, the one or more support members 218 comprise two or more elongated portions that extend across the adjustable cowl 220 to the aft end 205 of the adjustable cowl 220 when the cowl 220 is in its retracted position. It will be appreciated that the two or more elongated portions may alternatively extend only partially across the adjustable cowl 220, e.g., the elongated portions may extend less than halfway, about halfway, or more than halfway across the adjustable cowl 220.

Referring now to FIG. 5, the adjustable cowl 220 is shown in an extended position. As discussed previously, the space between the adjustable cowl 220 and the fixed shroud 215 is the bypass passage 225. By opening the bypass passage 225, flow output through the gas turbine engine is able to exit through the bypass passage 225 and the nozzle exit area 21 (A9) is increased. By the direct relationship between the nozzle exit area 21 (A9) and the actual area ratio 20, the actual area ratio 20 is also increased.

Figure 7:
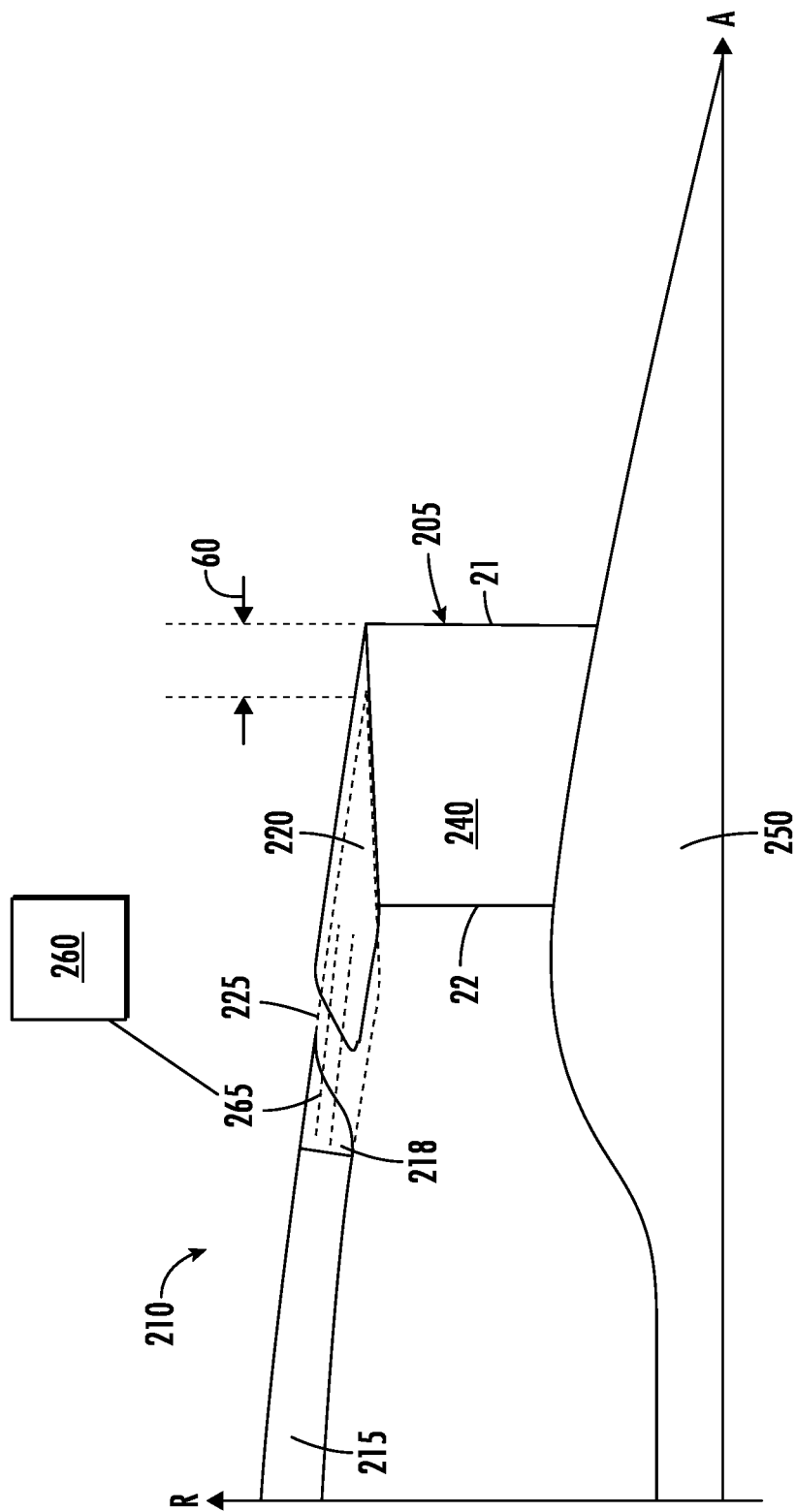
FIG. 7 illustrates a cross-sectional schematic of the adjustable cowl in the retracted position and in the extended position.

Referring now to FIG. 7, a cross-sectional schematic of the variable area exhaust nozzle system 200 is shown. The illustration shows the adjustable cowl 220 in the retracted position, shown by the dotted lines, and in the extended position, shown by the solid lines. In the illustrative embodiment, the adjustable plug 250 is shown in the retracted position. As mentioned above, the extended position of the adjustable cowl 220 defines the bypass passage 225, through which the flow output may exit, thereby increasing both the nozzle exit area 21 (A9) and the actual area ratio 20.

It will be appreciated that while the adjustable cowl 220 may be moved to the retracted position or the extended position, the adjustable cowl 220 may also be moved along the axial direction A to any position between the retracted position and the extended position. For example, the adjustable cowl 220 in the retracted position may be positioned less than halfway, halfway, or over halfway to the extended position. Alternatively, the adjustable cowl 220 in the extended position may be positioned less than halfway, halfway, or over halfway to the retracted position.

Further, in the illustrative embodiment, the cowl stroke length 60 is shown as the maximum distance between the tip of the aft end 205 of the adjustable cowl 220 in the retracted position and the extended position. The cowl stroke length 60 may vary in length, e.g., between about 20 and about 30 centimeters, such as between about 22 to about 28 centimeters, such as between about 24 to about 27 centimeters, such as between about 25 to about 26 centimeters.

Figure 8:
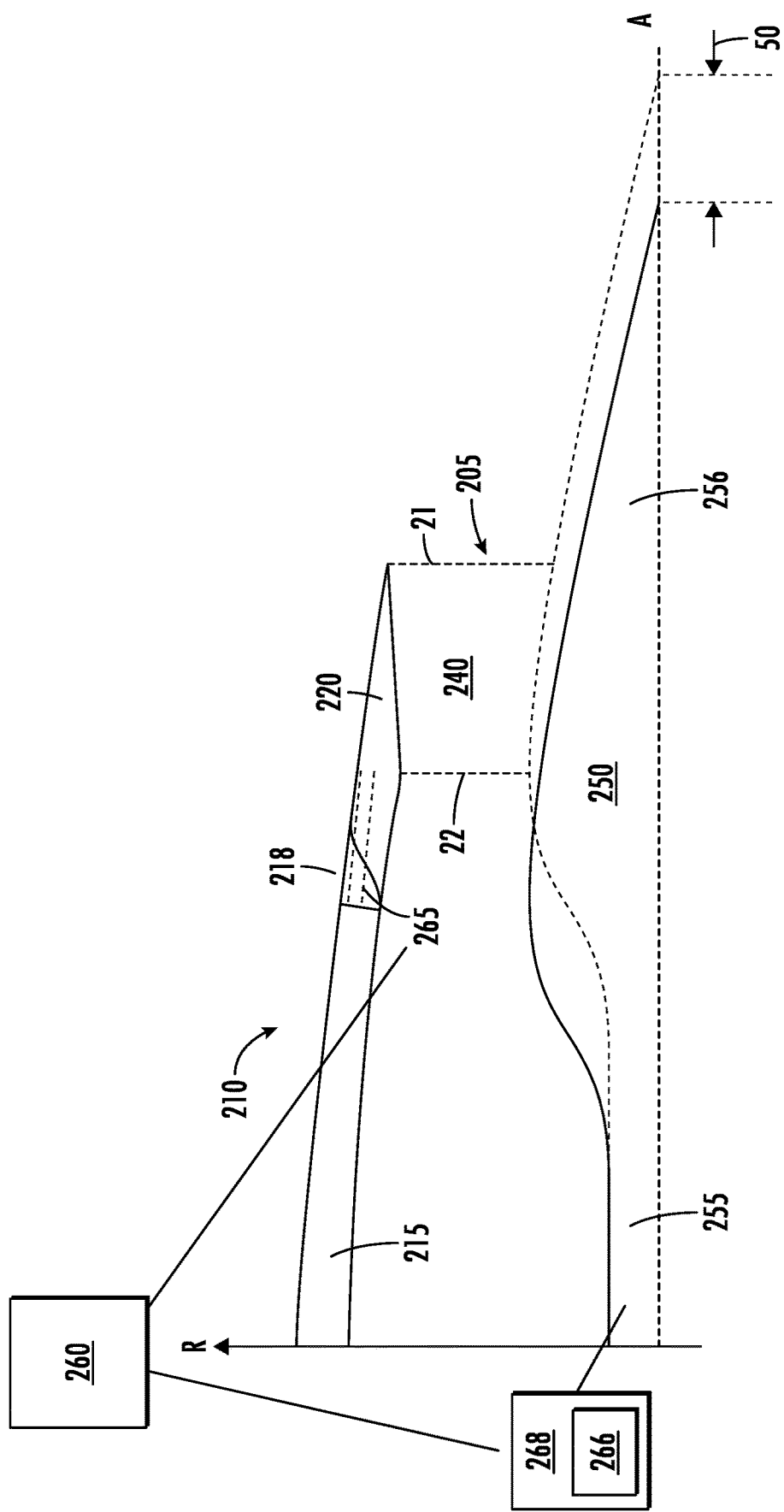
FIG. 8 illustrates a cross-sectional schematic of the adjustable plug in the retracted position and in the extended position.

Referring now to FIG. 8, another cross-sectional schematic of the variable area exhaust nozzle system 200 is shown. The illustration shows the adjustable cowl 220 in the retracted position and shows the adjustable plug 250 in both the retracted position, indicated by the solid line, and the extended position, indicated by the dotted line. As shown in the illustrative embodiment, the adjustable plug 250 is slidably positioned within the fixed shroud 215 and movable between the retracted position and the extended position along the axial direction A. Moving the adjustable plug 250 between the retracted position and the extended position varies the nozzle throat area 22 (e.g., A8). For example, by moving the adjustable plug 250 to the extended position, nozzle throat area 22 (e.g., A8) is increased and the actual area ratio 20 is decreased. Alternatively, moving the adjustable plug 250 to the retracted position decreases the nozzle throat area 22 (A8) and increases the actual area ratio 20.

Referring still to FIG. 8, the illustration shows the nozzle adjustment assembly 260 including the plug adjustment mechanism 268. As discussed previously, the plug adjustment mechanism 268 slidably couples the adjustable plug 250 to the propulsion system 10 for selectively moving the adjustable plug 250 along the axial direction A relative to the fixed shroud 215. For example, the plug adjustment mechanism 268 may include a lever arm attached to the shaft 255 of the adjustable plug 250 and at least one plug adjusting actuator 266 mechanically coupled to the lever arm for moving the adjustable plug 250 between the retracted position and the extended position. In a specific embodiment, the plug adjusting actuators 266 may be hydraulic actuators or electric actuators.

It will be appreciated that while the adjustable plug 250 may be moved to either the retracted position or the extended position, the adjustable plug 250 may also be moved along the axial direction A to any position between the retracted position and the extended position. For example, the adjustable plug 250 in the retracted position may be positioned less than halfway, halfway, or over halfway to the extended position. Alternatively, the adjustable plug 250 in the extended position may be positioned less than halfway, halfway, or over halfway to the retracted position.

Further, referring still to FIG. 8, the plug stroke length 50 is shown as the maximum distance between the tip of the profiled tail cone 256 of the adjustable plug 250 in the retracted position and the extended position. The plug stroke length 50 for the adjustable plug 250 may be between about 60 and about 90 centimeters, such as between about 65 and about 85 centimeters, such as between about 70 and about 80 centimeters, such as between about 75 and about 77 centimeters.

Figure 9:
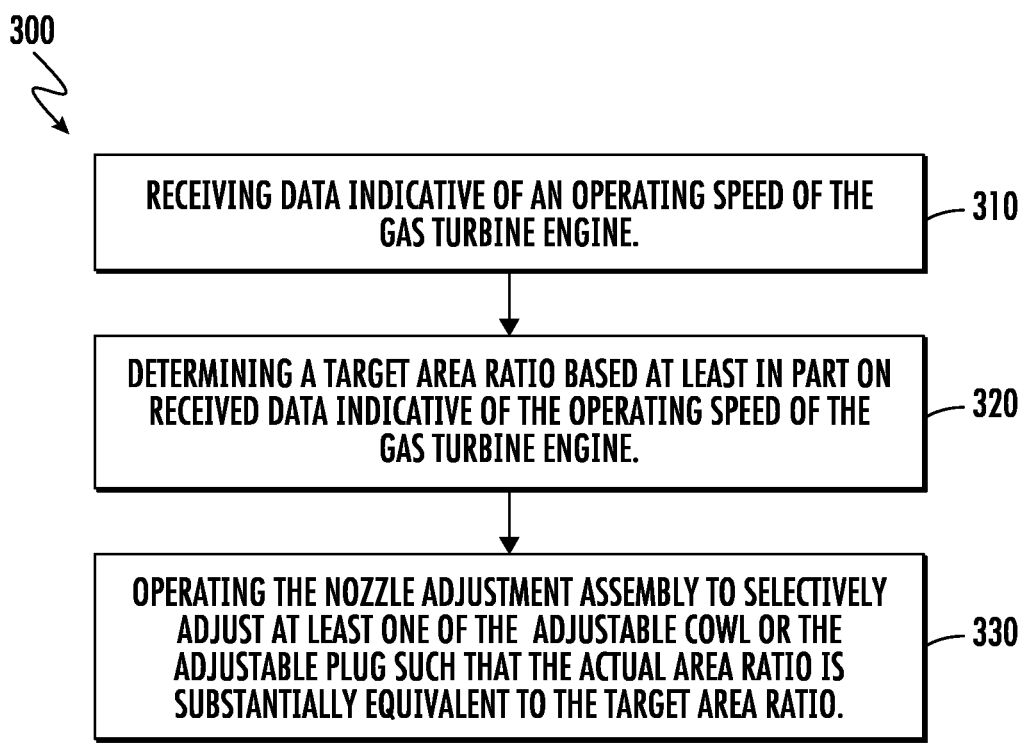
FIG. 9 illustrates a flow diagram of one embodiment of a method for controlling the variable exhaust nozzle of a gas turbine engine in accordance with aspects of the present subject matter.

Referring now to FIG. 9, a flow diagram illustrating an exemplary method 300 for controlling the variable area exhaust nozzle system 200 described in accordance with aspects of the present subject matter is shown. Specifically, the controller 270 of the variable area exhaust nozzle system 200 may be configured to carry out method 300. The method 300 includes, at block 310, receiving data indicative of an operating speed of the gas turbine engine, at block 320, determining a target area ratio 25 based at least in part on received data indicative of the operating speed of the gas turbine engine, and at block 330, operating the nozzle adjustment assembly 260 to selectively adjust at least one of the adjustable cowl 220 or the adjustable plug 250 such that the actual area ratio 20 is substantially equivalent to the target area ratio 25.

Block 310 includes receiving data indicative of an operating speed of the gas turbine engine. The operating speed is the speed the operator of the aircraft 100 would like to achieve and is related to the flight operating mode, e.g., supersonic cruise, transonic cruise, or takeoff. It will be appreciated that the operating speed may further include any other speed that the gas turbine engine is capable of reaching. Furthermore, the operating speed may be inputted into the controller 270 either directly by the operator of the aircraft, through remote electronic communication means, through a control panel, or through any other means known to those of ordinary skill in the art. Alternatively, the operating speed may be measured, calculated or otherwise determined by the controller 270 or other automated system after the aircraft operator inputs the flight operating mode. The automated system or controller 270 may also obtain the operating speed or flight operating mode directly through internal systems from the gas turbine engine as known to those of ordinary skill in the art.

At 320, a target area ratio is determined based at least in part on received data indicative of the operating speed of the gas turbine engine. The controller 270, a computer, or other automated system may be used to calculate the target area ratio 25. For example, referring briefly to FIG. 3, if the operating speed of the gas turbine engine is the speed for the take-off flight operating mode, and the gas turbine engine needs to enter transonic cruise mode, the controller 270 will determine a target area ratio 25 corresponding to transonic cruise flight operating mode based on the current operating speed.

After determining the target area ratio 25, the controller 270, at 330, will operate the nozzle adjustment assembly 260 to selectively adjust at least one of the adjustable cowl 220 or the adjustable plug 250 such that the actual area ratio 20 is substantially equivalent to the target area ratio 25. For example, the controller 270 will determine which position the variable area exhaust nozzle system 200 is currently in, i.e., what the actual area ratio 20 is, and compare the actual area ratio 20 to the target area ratio 25. The controller 270 may then signal the nozzle adjustment assembly 260 to position the adjustable cowl 220, the adjustable plug 250, or both. In some embodiments, the controller 270 may be programmed with geometries of the adjustable cowl 220 and the adjustable plug 250 for particular flight operating modes and/or speeds. The controller 270 may use this database of geometries to determine what positions the adjustable cowl 220 and the adjustable plug 250 need to be in to obtain the target area ratio 25. According to alternative embodiments, the controller 270 may further include position sensors on the adjustable cowl 220 and the adjustable plug 250. The controller 270 would use sensor feedback to position the adjustable cowl 220 and the adjustable plug 250 accordingly.

If the actual area ratio 20 is less than the target area ratio 25, for example, the controller 270 will send a signal to the nozzle adjustment assembly 260 to move the adjustable cowl 220 along the axial direction A towards its extended position to increase the nozzle exit area 21 (A9). The adjustable cowl 220 will be moved until the actual area ratio 20 is substantially equivalent to the target area ratio 25. In this embodiment, the nozzle adjustment assembly 260 may use the cowl adjustment mechanism 265 to move the adjustable cowl 220. Operating the cowl adjustment mechanism 265 may include positioning the adjustable cowl 220 in the retracted position, extended position, or a position between the retracted position and the extended position. In some embodiments, the adjustable plug 250 may remain in its retracted position while the adjustable cowl 220 is moving into position. It should be appreciated that controller 270 may be programmed or have access to a database of positions for the adjustable plug or cowl that are related to a target area ratio.

In another example, if the actual area ratio 20 is greater than the target area ratio 25, the adjustable plug 250 will be moved along the axial direction A towards its extended position. Moving the adjustable plug 250 will increase the nozzle throat area 22 (A8). The nozzle adjustment assembly 260 may use a plug adjustment mechanism 268 to move the adjustable plug 250 until the actual area ratio 20 is substantially equivalent to the target area ratio 25. In this embodiment, the nozzle adjustment assembly 260 may use the plug adjustment mechanism 268 to move the adjustable plug 250. The plug adjustment mechanism 268 may position the adjustable plug 250 in the retracted position, extended position, or a position between the retracted position and the extended position. In some embodiments, the adjustable cowl 220 may remain in its retracted position while the adjustable plug 250 is moving into position.

Further, in an exemplary embodiment, the actual area ratio 20 or target area ratio 25 shown in FIG. 9 may vary in a range between about 1 to about 1.3, about 1 to about 1.290, or from about 1 to about 1.280.

It will be appreciated that the variable area exhaust nozzle may be used in any compatible engine. Furthermore, the variable exhaust nozzle system may include other embodiments that improve efficiency of operation of gas turbine engines. One of ordinary skill in the art will recognize that the inherent flexibility of the adjustable cowl and adjustable plug combination allows for a great variety of possible configurations, combinations, and divisions of tasks and functionality between and among components.

Further aspects of the invention are provided by the subject matter of the following clauses:

1. A variable area exhaust nozzle for a gas turbine engine, the gas turbine engine defining an axial direction, the variable area exhaust nozzle comprising: a shroud assembly comprising a fixed shroud and an adjustable cowl mechanically coupled to the fixed shroud, the shroud assembly defining an aft end; an adjustable plug slidably positioned within the fixed shroud and being movable between a retracted position and an extended position along the axial direction, wherein an annular passage is defined between the adjustable cowl and the adjustable plug, and wherein the variable area exhaust nozzle defines an actual area ratio equivalent to a nozzle exit area over a nozzle throat area; and a nozzle adjustment assembly for selectively positioning at least one of the adjustable cowl or the adjustable plug.

2. The variable area exhaust nozzle of any preceding clause, the variable area exhaust nozzle further comprising: a controller operably coupled to the nozzle adjustment assembly, the controller being configured to: receive data indicative of an operating speed of the gas turbine engine; determine a target area ratio based at least in part on received data indicative of the operating speed of the gas turbine engine; and operate the nozzle adjustment assembly to selectively adjust at least one of the adjustable cowl or the adjustable plug such that the actual area ratio is substantially equivalent to the target area ratio.

3. The variable area exhaust nozzle of any preceding clause wherein the target area ratio is between about 1 and about 1.3.

4. The variable area exhaust nozzle of any preceding clause wherein the adjustable cowl is movable between a retracted position and an extended position along the axial direction.

5. The variable area exhaust nozzle of any preceding clause wherein the adjustable cowl is immediately adjacent the aft end of the fixed shroud in the retracted position and is spaced apart to define a bypass passage in the extended position.

6. The variable area exhaust nozzle of any preceding clause wherein the adjustable plug is movable between a retracted position and an extended position along the axial direction.

7. The variable area exhaust nozzle of any preceding clause wherein the adjustable cowl defines a cowl stroke length between about 20 centimeters and about 30 centimeters.

8. The variable area exhaust nozzle of any preceding clause wherein the adjustable plug comprises: a shaft slidably coupled to the gas turbine engine and defining an aft end; and a profiled tail cone defined at the aft end of the shaft.

9. The variable area exhaust nozzle of any preceding clause wherein the adjustable plug defines a plug stroke length between about 60 centimeters and about 90 centimeters.

10. The variable area exhaust nozzle of any preceding clause wherein the nozzle adjustment assembly comprises: a cowl adjustment mechanism mechanically coupling the adjustable cowl to the fixed shroud for selectively moving the adjustable cowl relative to the fixed shroud; and a plug adjustment mechanism slidably coupling the adjustable plug to the gas turbine engine for selectively moving the adjustable plug relative to the fixed shroud.

11. The variable area exhaust nozzle of any preceding clause wherein the shroud assembly comprises: one or more support structures, wherein the one or more support structures are positioned proximate the aft end of the shroud assembly.

12. The variable area exhaust nozzle of any preceding clause wherein the one or more support structures further comprise: a first support member; and a second support member, wherein each of the first support member and the second support member are mechanically coupled to the adjustable cowl.

13. The variable area exhaust nozzle of any preceding clause wherein the cowl adjustment mechanism further comprises: a first track extending along the axial direction of the first support member; a second track extending along the axial direction of the second support member; and at least one cowl adjusting actuator mechanically coupled to the first track, the second track, or both.

14. The variable area exhaust nozzle of any preceding clause wherein the plug adjustment mechanism further comprises: a lever arm attached to the shaft of the adjustable plug; and at least one plug adjusting actuator mechanically coupled to the lever arm.

15. The variable area exhaust nozzle of any preceding clause wherein the at least one plug adjusting actuator is a hydraulic actuator or an electric actuator.

16. A method of operating a variable exhaust nozzle for a gas turbine engine defining an axial direction, the variable exhaust nozzle including a shroud assembly comprising a fixed shroud and an adjustable cowl mechanically coupled to the fixed shroud and being movable along the axial direction, an adjustable plug slidably positioned within the fixed shroud and being movable along the axial direction, and a nozzle adjustment assembly for selectively positioning at least one of the adjustable cowl or the adjustable plug, wherein the variable exhaust nozzle defines an actual area ratio equivalent to a nozzle exit area over a nozzle throat area, the method comprising: receiving data indicative of an operating speed of the gas turbine engine; determining a target area ratio based at least in part on received data indicative of the operating speed of the gas turbine engine; and operating the nozzle adjustment assembly to selectively adjust at least one of the adjustable cowl or the adjustable plug such that the actual area ratio is substantially equivalent to the target area ratio.

17. The method of any preceding clause wherein the target area ratio is between about 1 to 1.3.

18. The method of any preceding clause wherein operating the nozzle adjustment assembly further comprises: operating at least one of a cowl adjustment mechanism or a plug adjustment mechanism.

19. The method of any preceding clause wherein operating at least one of the cowl adjustment mechanism or the plug adjustment mechanism comprises: positioning the adjustable cowl in a retracted position, an extended position, or a position between the retracted position and the extended position.

20. The method of any preceding clause wherein operating the at least one of the cowl adjustment mechanism or the plug adjustment mechanism comprises: positioning the adjustable plug in a retracted position, an extended position, or a position between the retracted position and the extended position.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A variable area exhaust nozzle for a gas turbine engine, the gas turbine engine defining an axial direction, the variable area exhaust nozzle comprising:
    a shroud assembly comprising a fixed shroud and an adjustable cowl mechanically coupled to the fixed shroud, the fixed shroud defining an aft end and the adjustable cowl having a forward end;
    an adjustable plug slidably positioned within the fixed shroud and being movable between a retracted position and an extended position along the axial direction, wherein an annular passage is defined between the adjustable cowl and the adjustable plug, and wherein the variable area exhaust nozzle defines an actual area ratio equivalent to a nozzle exit area over a nozzle throat area; and
    a nozzle adjustment assembly for selectively positioning at least one of the adjustable cowl or the adjustable plug,
    wherein the adjustable cowl is movable between a retracted position and an extended position along the axial direction, and
    wherein the adjustable cowl is immediately adjacent the aft end of the fixed shroud in the retracted position and is spaced apart along the axial direction to define a radial bypass passage between the aft end of the fixed shroud and the forward end of the adjustable cowl when the adjustable cowl is in the extended position.

2. The variable area exhaust nozzle of claim 1, the variable area exhaust nozzle further comprising:
    a controller operably coupled to the nozzle adjustment assembly, the controller being configured to:
    receive data indicative of an operating speed of the gas turbine engine;
    determine a target area ratio based at least in part on received data indicative of the operating speed of the gas turbine engine; and
    operate the nozzle adjustment assembly to selectively adjust at least one of the adjustable cowl or the adjustable plug such that the actual area ratio is substantially equivalent to the target area ratio.

3. The variable area exhaust nozzle of claim 2, wherein the target area ratio is between about 1 and about 1.3.

4. The variable area exhaust nozzle of claim 2, wherein the target area ratio is between about 1 and about 1.3, and wherein the adjustable cowl defines a cowl stroke length between about 20 centimeters and about 30 centimeters.

5. The variable area exhaust nozzle of claim 4, wherein the adjustable plug defines a plug stroke length between about 60 centimeters and about 90 centimeters.

6. The variable area exhaust nozzle of claim 1, wherein the adjustable plug is movable between a retracted position and an extended position along the axial direction.

7. The variable area exhaust nozzle of claim 1, wherein the adjustable cowl defines a cowl stroke length between about 20 centimeters and about 30 centimeters.

8. The variable area exhaust nozzle of claim 1, wherein the adjustable plug comprises:
    a shaft slidably coupled to the gas turbine engine and defining an aft end; and
    a profiled tail cone defined at the aft end of the shaft.

9. The variable area exhaust nozzle of claim 8, wherein the nozzle adjustment assembly comprises:
    a cowl adjustment mechanism mechanically coupling the adjustable cowl to the fixed shroud for selectively moving the adjustable cowl relative to the fixed shroud; and
    a plug adjustment mechanism slidably coupling the adjustable plug to the gas turbine engine for selectively moving the adjustable plug relative to the fixed shroud.

10. The variable area exhaust nozzle of claim 9, wherein the shroud assembly comprises:
    one or more support structures, wherein the one or more support structures are positioned proximate an aft end of the shroud assembly.

11. The variable area exhaust nozzle of claim 10, wherein the one or more support structures further comprise:
    a first support member; and a second support member, wherein each of the first support member and the second support member are mechanically coupled to the adjustable cowl.

12. The variable area exhaust nozzle of claim 11, wherein the cowl adjustment mechanism further comprises:
    a first track extending along the axial direction of the first support member;
    a second track extending along the axial direction of the second support member; and
    at least one cowl adjusting actuator mechanically coupled to the first track, the second track, or both.

13. The variable area exhaust nozzle of claim 9, wherein the plug adjustment mechanism further comprises:
    a lever arm attached to the shaft of the adjustable plug; and
    at least one plug adjusting actuator mechanically coupled to the lever arm.

14. The variable area exhaust nozzle of claim 13, wherein the at least one plug adjusting actuator is a hydraulic actuator or an electric actuator.

15. The variable area exhaust nozzle of claim 1, wherein the adjustable plug defines a plug stroke length between about 60 centimeters and about 90 centimeters.

16. A method of operating a variable exhaust nozzle for a gas turbine engine defining an axial direction, the variable exhaust nozzle including a shroud assembly comprising a fixed shroud and an adjustable cowl mechanically coupled to the fixed shroud and being movable along the axial direction, an adjustable plug slidably positioned within the fixed shroud and being movable along the axial direction, and a nozzle adjustment assembly for selectively positioning at least one of the adjustable cowl or the adjustable plug, wherein the variable exhaust nozzle defines an actual area ratio equivalent to a nozzle exit area over a nozzle throat area, wherein the adjustable cowl is immediately adjacent an aft end of the fixed shroud in a retracted position and spaced apart along the axial direction to define a radial bypass passage between the aft end of the fixed shroud and a forward end of the adjustable cowl when the adjustable cowl is in an extended position, the method comprising:
    receiving data indicative of an operating speed of the gas turbine engine;
    determining a target area ratio based at least in part on received data indicative of the operating speed of the gas turbine engine; and
    operating the nozzle adjustment assembly to selectively adjust the adjustable cowl such that the actual area ratio is substantially equivalent to the target area ratio,
    wherein operating the nozzle adjustment assembly to selectively adjust the adjustable cowl comprises spacing apart the adjustable cowl from the fixed shroud along the axial direction to define the radial bypass passage.

17. The method of claim 16, wherein the target area ratio is between about 1 to 1.3.

18. The method of claim 16, wherein operating the nozzle adjustment assembly further comprises:
    operating a cowl adjustment mechanism.

19. The method of claim 18, wherein operating at least one of the cowl adjustment mechanism comprises:
    positioning the adjustable cowl in a retracted position, the extended position, or a position between the retracted position and the extended position.

20. The method of claim 18, wherein operating the nozzle adjustment assembly further comprises operating a plug adjustment mechanism by positioning the adjustable plug in a retracted position, an extended position, or a position between the retracted position and the extended position.

* * * * *